United States Patent
Teramachi

[11] 3,897,982
[45] Aug. 5, 1975

[54] SLIDE WAY BEARING

[76] Inventor: Hiroshi Teramachi, Higashi-Tamagawa, Setagaya-ku, Tokyo, Japan

[22] Filed: Sept. 20, 1973

[21] Appl. No.: 399,327

[52] U.S. Cl. ............... 308/6 R; 308/6 C; 308/3 A
[51] Int. Cl. .... F16c 17/00; F16c 19/00; F16c 29/00
[58] Field of Search ........................ 308/6 R, 6 C

[56] References Cited
UNITED STATES PATENTS
3,037,821   6/1962   Schutz ............................... 308/6 C FOREIGN PATENTS OR APPLICATIONS
1,144,547   2/1963   Germany ........................... 308/6 R
1,575,658   1/1970   Germany ........................... 308/6 C
1,235,238   5/1960   France .............................. 308/6 R

*Primary Examiner*—Charles J. Myhre
*Assistant Examiner*—William C. Anderson
*Attorney, Agent, or Firm*—McGlew and Tuttle

[57] ABSTRACT

A slide way bearing is capable of bearing the load, imposed on a track shaft of the bearing, from all directions. The bearing has oval shaped ball raceways having transversely curved load-bearing surfaces corresponding to the curvature of the balls. The track shaft has angularly spaced ribs extending in parallel relation longitudinally thereof, and each disposed between a pair of race ways. The race ways are formed by cooperating grooves in the inner surface of a sleeve and in the outer surface of a ball retainer, the ball retainer being telescoped in the sleeve and embracing that portion of the track shaft projecting upwardly above a bed. The sleeve, the ball retainer and the ribs are relatively arranged in the manner such that the balls in the race ways, when adjacent the ribs, are in load bearing contact with the track shaft, the sleeve and the ribs and, when in other portions of the race way, are out of contact with the track shaft and the ribs and are free of load.

5 Claims, 4 Drawing Figures

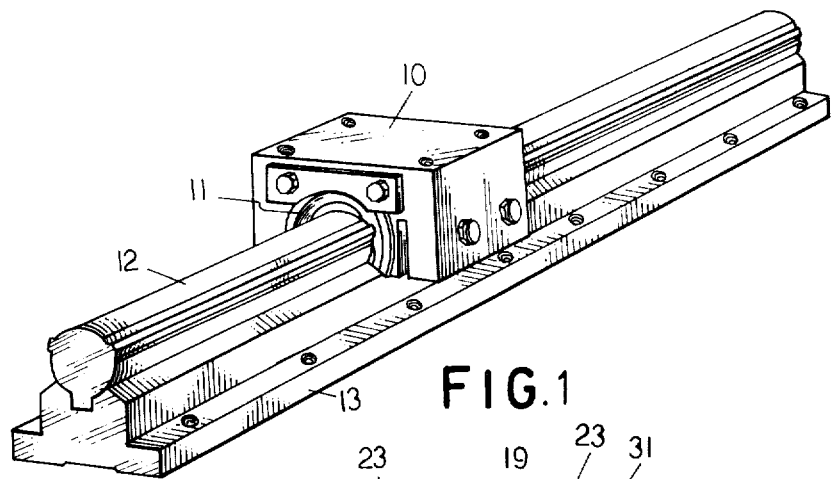
FIG.1
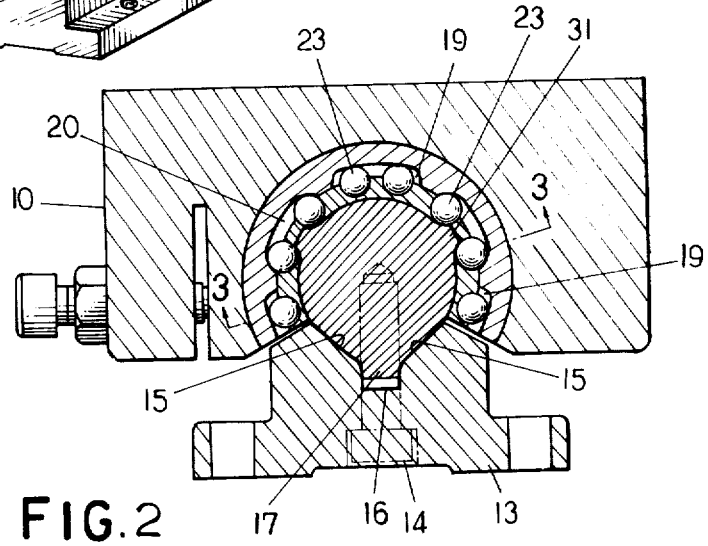
FIG.2
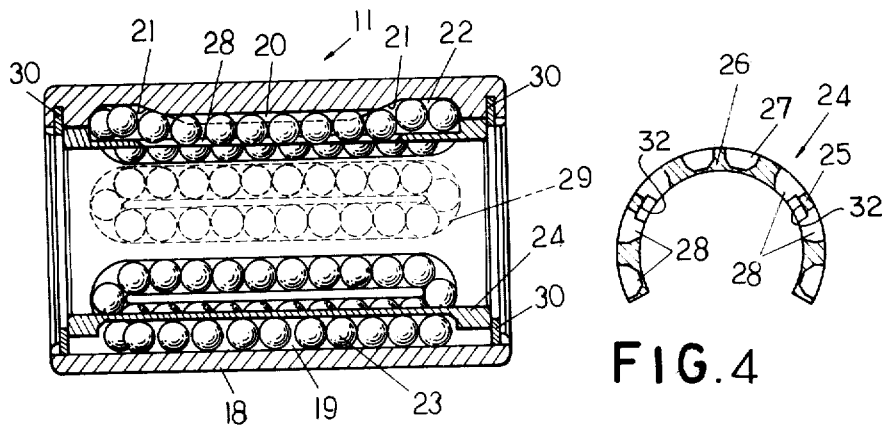
FIG.3
FIG.4

SLIDE WAY BEARING

SUMMARY OF THE INVENTION

This invention has its principal object to provide a slide way bearing capable of bearing the load imposed on an outer sleeve member of the bearing, mounted on a track shaft, from all directions.

The invention has a further object to provide a slide way bearing including a track shaft, an outer sleeve and a ball retainer telescoped in the outer sleeve and embracing that portion of the track shaft extending upwardly from a bed, the track shaft being formed with ribs extending longitudinally thereof and the sleeve and the ball retainer defining oval race ways for balls, with each rib being disposed between a pair of race ways and the ball-contacting surfaces of the race ways and of the ribs being curved to conform to the curvature of the balls to increase the area of contact between the balls, the race ways and the ribs to improve the load-bearing characteristics, with the ribs preventing angular displacement of the ball-bearing assembly on the track shaft.

The invention itself as well as advantageous features thereof will become apparent when reference is given to the following detailed description of a preferred embodiment thereof, the detailed description referring to the appended drawing.

BRIEF DESCRIPTION OF THE DRAWINGS

In the Drawings:

FIG. 1 is a perspective view of a slide way bearing of the invention;

FIG. 2 is a transverse section of the slide way bearing of FIG. 1;

FIG. 3 is a longitudinal sectional view of the slide way bearing along the line 3-3 of FIG. 2 without the track shaft; and FIG. 4 is a cross sectional view of a ball retainer of the bearing of the invention.

DESCRIPTION OF THE PREFERRED EMBODIMENT

The slide way bearing of the invention comprises a saddle member 10, a ball bearing assembly 11, a track shaft 12 and a length of bed 13. The saddle member 10 is adapted to mount thereon a movable member of a machine tool (not shown) movable to and fro along the bed. The track shaft 12 is fixedly secured to the bed 13 by means of bolts 14. For facilitating assembling, and in order to increase the force of engagement between shaft 12 and bed 13, bed 13 has a central, longitudinally extending V-shaped recess in its upper surface opening into a central rectangular groove or channel 16. The included angle of recess 15° 120°. The track shaft 12 is also tapered its lower side at an included angle of 120°, corresponding to the recess 15 of the bed 13, and has a longitudinal rib or projection 17 which is received by the central groove 16 of the bed.

The ball bearing assembly 11 includes an outer sleeve 18 which may be formed by machining steel tubing to a C-shaped cross section and cutting it into pieces of the desired length of the bearing to be manufactured. The sleeve 18 is further machined on its inside wall surface at the center and both end portions to form parallel grooves 19 which extend substantially the entire length of the sleeve.

The sleeve 18 is further machined to form a pair of longitudinal grooves 20, each positioned between two of the above-mentioned groove 19 in parallel to one another. The second-mentioned grooves 20 are slightly shallower than the first-mentioned grooves 19. The ends of each second groove 20 are connected, by means of sloped grooves 21 and arcuate grooves 22, to one adjacent first groove 19. It should be noted that the side wall faces of second grooves 20 have a curvature substantially equal to that of the balls 23.

The balls 23 are carried by the ball retainer 24 which has a C-shaped cross section similar to that of the outer sleeve 18. The ball retainer 24 has thinner wall portions 25 and thicker wall portions 26, as shown especially in FIG. 4. Formed on the outer wall surface of the ball retainer 24, at the thicker wall portion 26, are guide grooves 27 for balls 23. At the thinner wall portions 25, the ball retainer 24 is formed with slot openings 28, the size or width of which is smaller than the diameter of the balls 23. Thus oval shaped ball raceways 29 are formed in the ball retainer 24 for substantially filling the same with the balls 23. The retainer 24 with balls 23 is fixed inside the sleeve 18 by means of end rings 30. The inner surface of the ball retainer 24 is further formed with rectangular grooves 32 extending longitudinally thereof and engageable with ribs 31.

The track shaft 12 has a pair of projections 31 which the extend entire length of the shaft. It should be also noted that the opposite sides or flanks of the projections 31 have a curvature substantially equal to that of balls 23. The oval shaped ball raceways 29 are so arranged that the loadcarrying balls, or the balls which are placed in the second grooves 20 on sleeve 18 and are partly exposed through the slot openings 28 of retainer 24, are in direct bearing contact with the mating raceway surfaces on the projections 31. On the other hand, the balls in the first grooves 19 on sleeve 18 are free of the load.

In operation, as the saddle member 10 moves along the bed 13 in either direction, the balls 23 in the raceways or in contact with the grooves 20 and the projections 31, are caused to circulate in the raceways to and along the connecting grooves 21 and 22 and to the grooves 19 where they become free from the load, and vice versa.

The slide way bearing of the invention can, like an angular contact type bearing, bear a thrust load and as well as bear the load imposed on the outer sleeve 18 from all directions.

As previously described, the load-bearing characteristics is increased and improved since there are provided a large area of contact between the balls and the raceways due to the provision of curved load-bearing surfaces along the raceways.

As will be understood from the drawing, the balls which bear an upwardly directed load are positioned higher than the axis of the track shaft 12. Thus it is possible to largely machine the lower side of the outer sleeve 18 so as to use a more rigid bed and to lower its height for increasing the stability.

In manufacturing the track shaft 12, it is easy to machine it in conformity with the bearing for obtaining a precise slide way. The device of the invention is readily mounted on various machines and is also easy to dismount therefrom for overhaul work.

While a specific embodiment of the invention has been shown and described in detail to illustrate the ap-

I claim:

1. A slide way bearing comprising, in combination, an elongated bed; an elongated track shaft secured to said bed to extend therealong and project thereabove, at least that portion of said track shaft projecting above said bed having a circular cross section, and said track shaft having plural, angularly spaced ribs extending in parallel relation longitudinally thereof; a sleeve, having a C-shaped cross-section conforming, in arcuate extent, to substantially the cross section of said upwardly projecting portion of said track shaft; said sleeve being formed with pairs of longitudinal sleeve grooves in its inner surface, with one sleeve groove of each pair being deeper than the other sleeve groove of the pair, the sleeve grooves of each pair having their opposite ends interconnected by arcuate grooves; a ball retainer, having a C-shaped cross-section conforming in arcuate extent substantially to the arcuate extent of said upwardly projecting track shaft portion, telescoped in said sleeve and embracing said projecting portion of said track shaft; said ball retainer being formed with pairs of longitudinal retainer grooves in its outer surface, with one retainer groove of each pair being deeper than the other retainer groove of the pair, and the retainer grooves of each pair having their opposite ends interconnected by arcuate grooves; said retainer grooves being aligned with said sleeve grooves and each deeper retainer groove having a slotted bottom and being aligned with a shallower sleeve groove, said sleeve and retainer grooves conjointly forming oval race ways for balls; each of said ribs being disposed between a pair of race ways whose slotted retainer grooves are juxtaposed to the rib; and balls in each of said race ways; said sleeve, said ball retainer and said ribs being relatively arranged in a manner such that balls in said race ways, when in said slotted retainer grooves, are in load bearing contact with said track shaft, said sleeve and said ribs, and, when in said deeper sleeve grooves, are out of contact with said track shaft and said ribs and are free of load.

2. A slide way bearing, as claimed in claim 1, in which said grooves are curved transversely to conform to the curved surfaces of said balls.

3. A slide way bearing, as claimed in claim 2, in which the sides of said ribs are curved transversely to conform to the curvature of said balls.

4. A slide way bearing, as claimed in claim 1, in which the upper surface of said bed is formed with an elongated V-shaped groove terminating, at its lower edge, in a substantially rectangular channel; the lower portion of said track shaft having downwardly converging V-shaped surfaces mating with said groove and a rectangular rib engageable in said rectangular channel.

5. A slide way bearing, as claimed in claim 1, in which the inner surface of said ball retainer is formed with rectangular grooves extending therealong each engageable with a respective one of said ribs.

* * * * *